United States Patent [19]

Hadaway

[11] Patent Number: 4,928,375
[45] Date of Patent: May 29, 1990

[54] METHOD OF FORMING A HOLLOW FASTENER FROM SHEET METAL

[76] Inventor: Bernard M. Hadaway, 10 Highland Avenue, Highett, Victoria, Australia, 3190

[21] Appl. No.: 249,192

[22] Filed: Sep. 26, 1988

Related U.S. Application Data

[63] Continuation of Ser. No. 86,177, Aug. 13, 1987, abandoned, which is a continuation of Ser. No. 785,610, Oct. 8, 1985, abandoned.

[30] Foreign Application Priority Data

Oct. 11, 1984 [AU] Australia ............... PG7593

[51] Int. Cl.⁵ .................... B21D 39/00; B23P 11/00
[52] U.S. Cl. ........................ 29/509; 29/469.5; 29/524.1; 10/27 PH; 72/265; 192/107 C
[58] Field of Search ............ 29/524.1, 522.1, 509, 29/469.5; 192/107 C; 72/256, 264, 265, 379; 10/27 PH

[56] References Cited

U.S. PATENT DOCUMENTS

| | | | |
|---|---|---|---|
| 2,630,199 | 3/1953 | Gamble | 192/107 C |
| 2,812,842 | 11/1957 | Thelander | 192/107 C |
| 3,276,112 | 10/1966 | Tantlinger et al. | 29/522 A X |
| 3,307,737 | 3/1967 | Harvey et al. | 29/522 A X |
| 3,440,713 | 4/1969 | Henchert | 29/522 A X |
| 3,479,733 | 11/1969 | Brown | 29/509 |
| 3,731,369 | 5/1973 | Johnson | 29/522 A X |
| 3,977,225 | 8/1976 | Couchman | 72/265 |
| 3,993,428 | 11/1976 | Gumm et al. | 29/522 A X |
| 4,145,801 | 3/1979 | Schrecker et al. | 29/522 A X |
| 4,400,964 | 8/1983 | Kondo et al. | 72/265 |

FOREIGN PATENT DOCUMENTS 1303234 1/1973 United Kingdom .

Primary Examiner—Charlie T. Moon
Attorney, Agent, or Firm—Stevens, Davis, Miller & Mosher

[57] ABSTRACT

A method of forming an integral fastener such as a rivet on a sheet metal component such as part of a clutch plate assembly. The method involves placing the metal sheet between a pair of dies so that portion of the sheet overlies a cavity in one die. The other die has an annular working face which surrounds the cavity in immediately adjacent relationship. A biased plunger is arranged for movement relative to both dies and is receivable in the die cavity with clearance. That plunger is engaged with the sheet portion on the side thereof opposite the cavity so as to apply a bias force to that portion which acts in the direction of the cavity. The annular working face is then applied to the metal sheet so as to compress an annular zone of that sheet. The combined effect of the bias force and the compression then causes material to yield in the annular zone and to be displaced from that zone to flow into the die cavity to form a hollow fastener in the clearance between the cavity and the plunger.

15 Claims, 3 Drawing Sheets

METHOD OF FORMING A HOLLOW FASTENER FROM SHEET METAL

This application is a continuation of application Ser. No. 086,177, filed Aug. 13, 1987, now abandoned which is a continuation of application Ser. No. 785,610, filed Oct. 8, 1985, now abandoned.

This invention relates to metal forming and is particularly concerned with forming fastening components from metal plate or sheet. The invention is also concerned with the manufacture of products which require face to face attachment of sheets of material, at least one of which sheets is composed of metal.

A tubular rivet is one form of fastener to which the first mentioned aspect of the invention may be applied and it will be convenient to hereinafter describe the invention with particular reference to rivet-type fasteners. It is known to manufacture tubular rivets from metal plate or sheet using a drawing technique, but that is generally limited to formation of rivets of relatively short length. Larger rivets are generally manufactured from a preform or slug using a compression extrusion technique in which the preform or slug is compressed within a chamber formed between a mandrel and the surrounding surface of a die cavity. Material is extruded out of the chamber as a consequence of the compressive action and flows in the direction of movement of the mandrel, but at a speed exceeding that of the mandrel. The forces generated in such a process are quite high and the speed differential between the mandrel and extruded material imposes high friction with consequent wear of the tool parts.

It is an object of one aspect of the present invention to provide an improved method of forming fasteners which overcomes or at least minimises the foregoing problems. It is a further object of the invention to provide a method of forming fasteners integral with a section of sheet or plate metal. Yet another object of the invention is to provide apparatus for carrying out such a method.

As previously stated, the invention is also concerned with face to face attachment of sheets of material. One application of that aspect of the invention is in the manufacture of clutch plates for automotive use in which a metal plate or plate-like component is interposed between and is connected to two oppositely facing layers of friction material, which may be of an asbestos composition. The friction material components are usually attached to the metal plate by riveting and that creates several problems.

Firstly, the layers of friction material must be sufficiently thick to accept the rivet heads and that adds significantly to the cost of the assembly. Secondly, the friction material must be drilled to accept the rivets and in the case of asbestos composition that creates a health hazard. Thirdly, the drilling is seldom performed with sufficient accuracy to result in a properly balanced assembly. That is, the circular array of rivets will not normally be concentric with the rotational axis of the clutch plate so that an out of balance condition results.

It is an object of a second aspect of the present invention to provide an improved method of attaching sheets of material in face to face relationship. It is a further object of the invention to provide such a method which avoids or at least minimises the problems referred to above. A still further object of the invention is to provide an improved type of friction lining for use in the manufacture of clutch plates and the like.

A problem inherent in fastening sheet material to another member or sheet, is the need to provide separate fasteners such as rivets and the further need to form holes in the material to receive such fasteners. That problem is overcome by one aspect of the present invention, at least when applied to sheet metal. According to that aspect, a section of sheet metal is provided with integral fastening means which may be of any one of several forms. The sheet metal section may be of plate or strip form and it may be flat, contoured, or bent as required. It is generally convenient, however, to form the fastening means while the sheet metal is in a flat condition and the following description will be directed to such an arrangement.

It is a characteristic of the foregoing aspect that the fastening means can be produced out of any part of a section of sheet metal. That is, the sheet metal does not require special preparation beforehand such as provision of a thickened portion from which the fastening means can be produced. It is a further characteristic that the fastening means can be formed so as to project beyond a surface of the sheet metal by a distance greater than the thickness of the sheet.

The method of forming an integral fastener in sheet metal can vary substantially, but in the basic form it involves pre-loading or biasing a selected portion of the sheet and then compressing an annular zone surrounding that selected portion so that material is caused to flow in the general direction of the pre-loading or bias. That is, the combined effect of the pre-loading and the compression is to cause material to flow into a cavity of suitable shape so as to form a hollow fastener within that cavity. The annular zone need not be circular but can be of any ring-like configuration.

In a practical application of the method briefly described above, the sheet metal is placed between two dies so as to overlie a cavity which is present in one of the dies. A plunger is arranged for movement into the cavity with clearance and is operable to apply pressure to the portion of sheet metal overlying the cavity so as to urge that portion into the cavity. The dies are operable to cause compression of the annular zone referred to above and the plunger provides the pre-loading or biasing referred to above.

The force applied to the sheet metal portion by the plunger must be sufficient so as to combine with the compressing operation to cause material within the compressed zone to yield and be induced to flow into the cavity to form a hollow body in the clearance which exists between the plunger and the cavity. In at least some circumstances the existance of sufficient plunger force is indicated by the fact that the plunger causes an indentation in the sheet metal before commencement of the compression step. On the other hand the force applied to the sheet metal by the plunger should not be so high as to cause the plunger to break through the sheet or rupture the sheet. The force applied by the plunger may or may not cause a permanent deformation. That is, in some circumstances, the material of the sheet metal may not be taken beyond its yield point prior to commencement of the compression step.

Preferably the plunger has a spherical or rounded nose portion which engages the sheet metal to cause the aforementioned indentation. It is further preferred that the nose portion is substantially fully contained within the indentation at completion of the indentation forming step.

According to one aspect of the present invention, there is provided a method of forming a hollow fastener from metal sheet including the steps of, placing the metal sheet between two dies one of which has a cavity therein and the other has a plunger connected thereto, said plunger being axially movable relative to the respective said die and being receivable in said cavity with clearance, causing said plunger to engage a portion of said sheet which overlies said cavity, subjecting said plunger to a bias force so as to urge it towards said cavity, and closing said dies so as to compress a portion of said sheet which surrounds said cavity and thereby allow metal to be displaced from that portion and to flow into said cavity under the influence of said biased plunger to form a hollow section of metal within said clearance.

In a preferred form of the above method, which is particularly suitable where the resultant fastener is to have a domed terminal end as is highly preferred, a nose portion of the plunger engages the metal sheet portion and the bias force applied to the plunger is such as to cause that nose portion to produce an indentation in the sheet portion prior to commencement of the compression step. It is further preferred that the nose portion is substantially fully contained in the indentation at the end of the indentation forming step.

According to another aspect of the invention, there is provided apparatus for forming a hollow fastener from metal sheet including, a pair of opposed dies, a cavity in one said die, a plunger mounted on the other said die so as to be axially movable relative thereto and located in substantial axial alignment with said cavity, said plunger being dimensioned relative to said cavity so as to be receivable therein with clearance, said other die having a working face which surrounds said plunger in close relation thereto and is adapted to engage a surface of a workpiece located between the two said dies to cause compression of portion of said workpiece surrounding said cavity, and biasing means resiliently urging said plunger into a rest position at which portion thereof projects beyond said working face.

The essential features of the invention, and further optional features, are described in detail in the following passages of the specification which refer to the accompanying drawings. The drawings, however, are merely illustrative of how the invention might be put into effect, so that the specific form and arrangement of the features (whether they be essential or optional features) shown is not to be understood as limiting on the invention.

Figure 1:
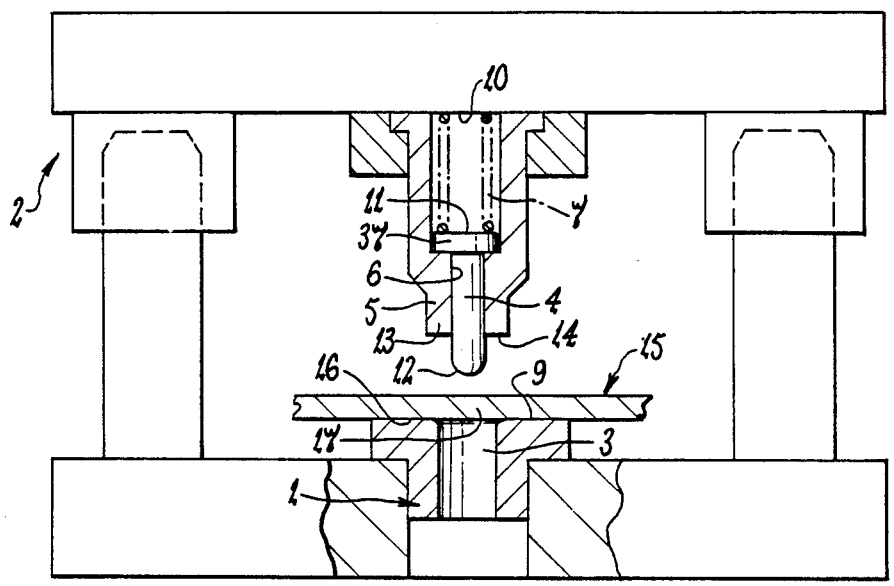
FIG. 1 is a diagrammatic partially sectioned view of one form of apparatus for carrying out a method in accordance with one embodiment of the invention.

The example apparatus shown in the accompanying drawings includes a fixed anvil 1 and a working head 2 which is mounted for movement towards and away from the anvil 1. A die cavity 3 is formed in the surface of the anvil 1 which faces the working head 2 and the working head 2 is carried by or formed integral with a ram or plunger (not shown) which is substantially coaxial with that cavity 3. The working head 2 comprises a bias forming tool 4 and a pressing tool 5, and the nature of each may vary according to the type of fastener intended to be formed. The cross-sectional shape and depth of the cavity 3 may also vary according to the type of fastener to be formed, but it is usually a cylindrical hole or recess and will be hereinafter described as having that form.

Apparatus as shown is to be used to form a blind end rivet type fastener, in which case the bias forming tool 4 may be a cylindrical or tapered plunger arranged coaxial with the die cavity 3 and having a diameter (maximum) less than that of the cavity 3. That is, the plunger 4 is receivable in the cavity 3 with clearance. If the plunger 4 is tapered, the degree of that taper need not be large. The plunger 4 is mounted within a bore 6 formed in the working head 2 so as to be capable of limited axial movement relative to the pressing tool 5, and is influenced by a spring 7 so as to normally project beyond an end of that bore 6 towards the die cavity 3 as shown in FIG. 1. In the arrangement shown, the plunger 4 is provided at one end with an enlarged head 37 which abuts against an opposed shoulder 8 of the pressing tool 5 so as to limit the extent of projection of the plunger 4. Pressure may be applied to the plunger 4 through a suitable spring 7 acting between a support surface 10 and an end 11 of the plunger 4, but other arrangements are clearly possible. For example, a bias force may be applied to the plunger 4 by a series of belleville washers or by fluid pressure or any other energy storage device. Also, assuming spring pressure is adopted, means may be provided whereby the spring pressure can be altered to suit different circumstances. The terminal end 12 or nose portion of the plunger 4 may be rounded, flat, or otherwise shaped to suit requirements, but the former shape is preferred in the example apparatus under discussion. The shape of the nose portion 12 will generally determine the shape of the end of the fastener formed by the method as hereinafter described.

The pressing tool 5 as shown comprises a portion 13 of the working head 2 which surrounds the plunger 4. The surface 14 of that portion 13 which faces the anvil 1 is of annular form and surrounds the end of the bore 6 through which the plunger 4 projects. The outer diameter of the surface 14 is greater than the diameter of the die cavity 3. The annular surface 14 is coaxial with the bore 6 and may be substantially flat as shown.

When apparatus as described is to be used, it is opened by separating the working head 2 from the anvil 1. A section 15 of sheet metal is placed within the apparatus so that a surface 16 thereof lies flat against the anvil surface 9 and a portion 17 of the section 15 overlies the cavity 3. Usually, the anvil surface 9 is flat, but it may be contoured if the apparatus is to be used with contoured sheet metal. The apparatus is then operated to move the working head 2 towards the anvil 1 and the nose portion 12 of the projecting plunger 4 is the first part of the head 2 to engage the adjacent surface of the sheet metal section 15.

Figures 2, 3:
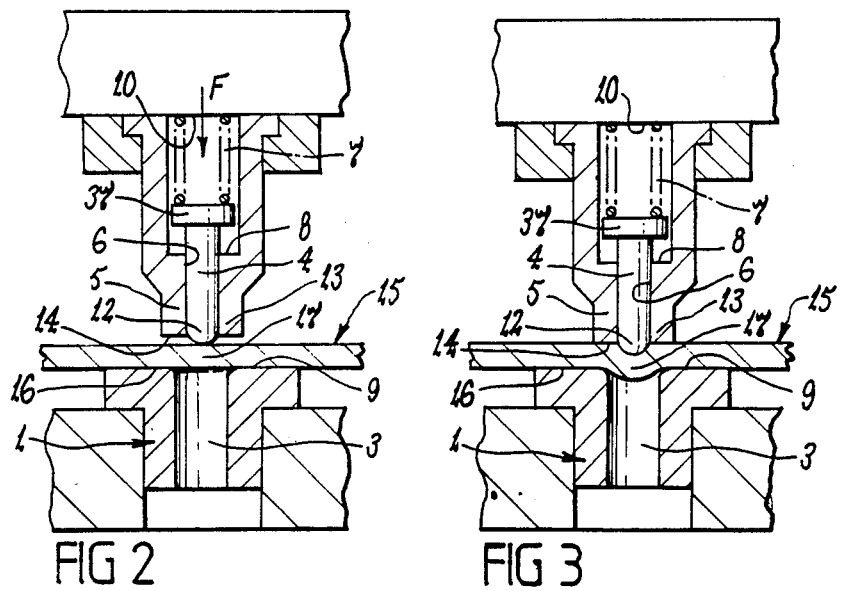
FIG. 2 is a view of part only of FIG. 1 showing the apparatus advanced towards a working stage.
FIG. 3 is a view similar to FIG. 2 but showing some distortion of the workpiece under the influence of the spring biased plunger.

As the apparatus continues its closing movement, the plunger 4 is pushed back into the pressing tool 5 against the action of the spring 7. The plunger 4 therefore exerts pressure against the sheet metal section 15 and the spring force applied to the plunger 4 is preferably such that the plunger 4 exerts a high force against the section 15. The force applied by the plunger 4, is generally sufficient if it causes an indentation to be produced in the section 15 before commencement of the compression step. Such a result is shown in FIG. 3 and as is evident from that Figure there is a protrusion opposite the indentation which projects into the cavity 3. Where such distortion of the sheet metal section 15 does occur, it may not commence until the plunger 4 is depressed some distance into the tool 5 so as to substantially compress the associated spring 7. In any event, the distortion is complete when the apparatus has advanced to the position shown in FIG. 3 at which the annular surface 14 of the pressing tool 5 engages the adjacent surface of the sheet metal section 15.

It is preferred as shown in FIG. 3 that, at the completion of the indentation forming step, the nose portion 12 of the plunger 4 is substantially fully contained within the indentation.

Figure 4:
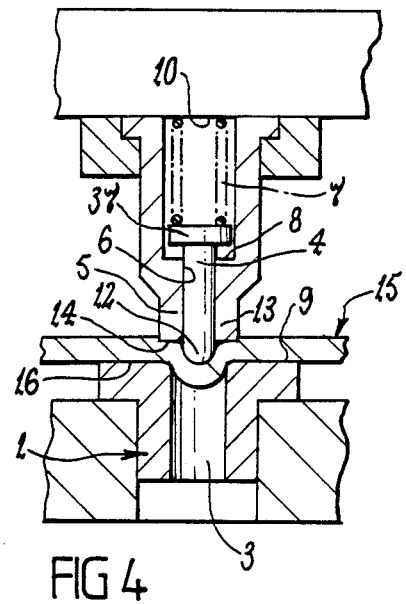
FIG. 4 is a view similar to FIG. 2 but showing the apparatus at a more advanced stage in the working process.
Figure 5:
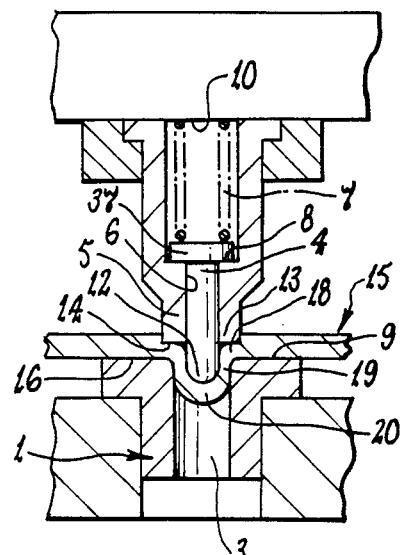
FIG. 5 is a view similar to FIG. 2 but showing the apparatus advanced to completion of the working stage.

After the annular surface 14 of the pressing tool 5 engages the sheet metal section 15 as shown in FIG. 3, continued closing movement of the apparatus causes the underlying annular zone 18 of the metal section 15 to be compressed as shown in FIGS. 4 and 5. Material within the annular zone 18 yields under the imposed forces so that it is able to be displaced out of that zone 18 and flow in the direction of the bias force imposed by the plunger 4. That is, the combined effects of the compression and the bias force is such as to cause the displaced material to flow inwards towards the axis of the tool 5 and generally axially into the underlying die cavity 3. In the result, the portion 17 of the sheet metal section 15 is projected into the die cavity 3 and is caused to extend under the influence of the spring loaded plunger 4 at a rate equivalent to that of displacement of material from the compressed annular zone 18. Displaced material therefore flows into the annular space existing between the plunger 4 and the die cavity 3 so that a cylindrical tubular portion 19 of metal is extruded from the main body of the sheet metal section 15. That extrusion operation continues until part of the apparatus (not shown) engages a stop surface (not shown) at which time the supply of displaced material ceases.

It is significant that the maximum bias force imposed on the metal section 15 by the plunger 4 is actually in place before the annular surface 14 engages the metal section 15. That is, the bias force acting on the portion 17 of the metal section 15 is at a maximum before compression of the zone 18 occurs, and as previously stated the bias force is quite high. Another point of some significance is the shape of the plunger nose portion 12. In the particular arrangement shown, the rounded shape of that nose portion 12 aids in the forming operation.

The bias imposed on the sheet metal section 15 by the spring loaded plunger 4 ensures that material within the compressed zone 18 will be caused to yield under the combined influence of the compression force and the plunger imposed force and as a result material will be displaced from the zone 18 and will flow into the die cavity 3 as the compression step continues. That is, the compressive force imposes a pushing influence on the material and the plunger force imposes a pulling force on the material.

It is significant that the plunger 4 and the displaced material will move together in the same direction at the same speed and frictional forces are not of the kind encountered in conventional rivet forming processes which employ compression extrusion. Also, there is no lateral compression of the flowing material in the space between the plunger 4 and surrounding surface of the die cavity 3, whereas such lateral compression does occur in conventional compression extrusion formation of tubular rivets. Still further, the working stroke of the tool 5 which causes the compression is small compared with that of the plunger 4. For example, the tool 5 may only move through 0.020 inch between the positions of FIGS. 3 and 5, whereas the plunger 4 may move through five times that distance in going from the FIG. 3 to the FIG. 5 position.

The axial projection of the extended portion 19 will vary according to the nature of the forming tools. The extent of that projection can be several times greater than the thickness of the sheet metal section 15—e.g., six times the thickness—without disturbing the integrity of the extended portion 19. In that regard, it is significant that the longitudinal wall of the extended portion 19 is composed entirely of material displaced from the compressed annular zone 18. The spring force acting on the plunger 4 will also be a factor in determining the length of the final extension and will control the efficiency of material transfer from the annular zone 18.

With the apparatus as described, the closed end 20 of the extended portion 19 will be domed or rounded, but that is not essential. If desired, the closed end may be substantially flat and it also follows that the shape of the initial deformation need not be as described above. Furthermore, the annular working surface 14 of the pressing tool 5 need not be flat as described. That surface 14 may slope in a manner such as to further encourage flow of material in the desired direction.

Figure 6:
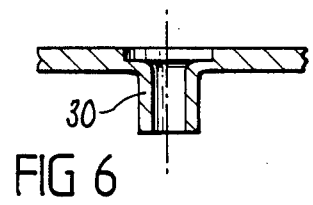
FIG. 6 is a sectional view of a form of fastener different to that shown in FIG. 5.
Figure 7:
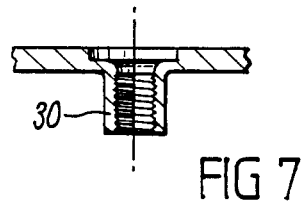
FIG. 7 is a view similar to FIG. 6 but showing the fastener internally threaded.

As an alternative to forming closed end rivets, the plunger 4, or another tool, may be arranged to pierce the end of the extended portion 19 after the extension has been completed and thereby produce an open ended fastener member 30 as shown in FIG. 6. Such an open ended member 30 may be used as a rivet or it may be internally screw-threaded as shown in FIG. 7 to receive a stud or other cooperative element.

The apparatus particularly described may be modified in other ways. For example, an annular working surface as previously described may be provided on the anvil 1 as an alternative to or in addition to the annular working surface 14 on the working head 2.

In describing the aforementioned apparatus and method it has been assumed that a single rivet is formed from the sheet metal section 15. It is of course possible to form a plurality of rivets in a single operation. For example, a circular array of such rivets may be formed if the section of sheet metal being treated is intended for use in a clutch plate assembly as hereinafter described. In that event, the working head 2 may include an annular member which carries a plurality of the bias forming and pressing tools 4 and 5. Also, a single anvil 1 may serve the entire group of tools 4 and 5.

It will be apparent that the method described has several advantages of practical significance. The provision of integral rivets and other fasteners on metal plate can greatly simplify manufacturing procedures and can also contribute to the accuracy and integrity of assemblies incorporating such plate. It is also significant that such integral fasteners are formed by an extrusion technique in which all extruded material flow is directed into the fastener body so there is no distortion of the surrounding body of plate or sheet material.

The method described is not limited to the manufacture of integral fasteners. It may be used with significant advantage in the manufacture of discrete tubular rivets and other tubular components. Assuming, however, that the method is applied to formation of integral fasteners, one possible use of the method is in the manufacture of clutch plates and other assemblies involving attachment of friction material in sheet form to a metal plate. As explained earlier in the specification, several problems are involved in the manufacture of such assemblies.

Figure 8:
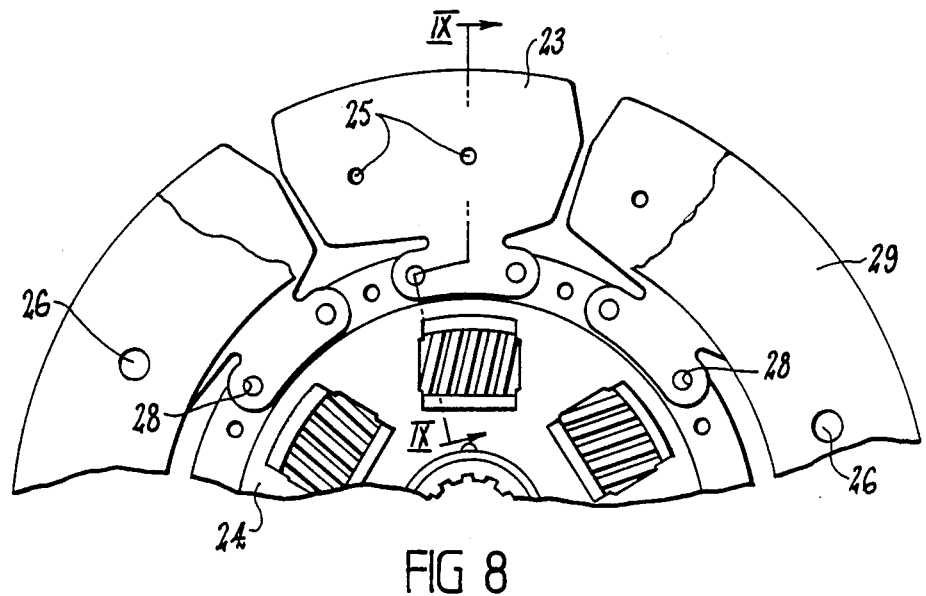
FIG. 8 is a view of part only of a clutch plate assembly.
Figure 9:
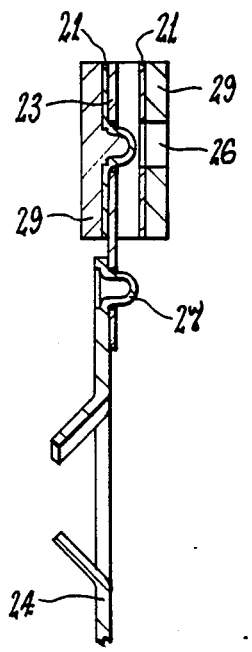
FIG. 9 is a transverse cross-sectional view taken along line IX—IX of FIG. 8, but omitting the springs shown in FIG. 8, and showing the fastening rivets as they would appear before the actual fastening step; and, FIG. 10 is a view similar to FIG. 9 but showing the rivets mechanically deformed to fasten the components of the clutch plate assembly together.
Figure 10:
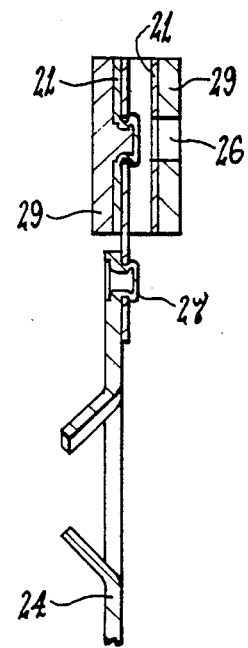

One application of the present invention relates to friction material for clutches and other purposes which is provided in laminated sheet form and comprises a layer of the friction material 29 and a metal backing 21 having integral fastening means 22 (FIGS. 8 to 10). The integral fastening means 22 of that metal backing 21 can be produced by the method previously described.

The friction material 29 and the metal backing plate 21 can be bonded together in any known manner. For example, the friction material 29 may be moulded directly over and heat bonded to a surface of the metal plate 21, which has the integral fastening means 22 already formed. Alternatively, the friction material 29 may be preformed and then bonded to the metal plate 21 in an appropriate manner. In either case the metal plate 21 may be pre-treated by phosphating, for example, to improve the bond, or an adhesive may be applied by spraying or another suitable process.

When the friction material 29 is intended for use in a clutch plate assembly as shown in FIGS. 8 to 10, the metal backing plate 21 may be annular having a series of integral rivets 22 arranged in equally spaced relationship in a circle concentric with the plate 21. It is usual in clutch assemblies to have two layers of friction material 29 arranged on respective opposite sides of a part 23 connected to the main body 24 of the clutch plate, and that part 23 is usually made of spring steel and is arranged to provide a cushioning effect as axial pressure is applied to the clutch plate. Several of the parts 23 are usually provided as shown in FIG. 8 and they are generally referred to as cushion segments.

In an assembly as shown in FIGS. 8 to 10, each cushion segment 23 is provided with holes 25 at appropriate positions to receive the integral rivets 22 of the laminated sheet backing 21. Preferably, there are twice as many such holes 25 as there are rivets 22 on each backing 21 so that the rivets 22 of each backing 21 are projected through respective alternate holes 25 of the cushion segments 23. Holes 26 may be provided through the friction material 29 of the opposed backing 21 to enable mechanical deformation of each rivet 22 to achieve the fastened condition as shown in FIG. 10.

As shown in FIGS. 8 to 10, integral rivets 27 may be also provided on the main plate 24 of the clutch plate and they can be formed in the manner previously described. Each rivet 27 can protrude through a hole 28 provided in a cushion segment 23 so as to enable that segment 23 to be secured to the main body 24 in the manner referred to above.

Figure 11:
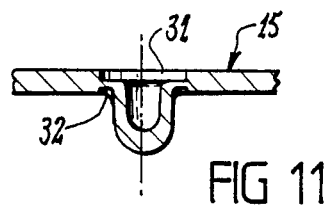
FIG. 11 shows a fastener produced by the method of the invention when the compression step creates an annular recess on both sides of the metal sheet.

FIG. 11 shows an alternative arrangement in which the dies are formed so as to create an annular recess 31 and 32 respectively on opposite sides of the sheet metal section 15.

The method of assembly as described above can be applied to various uses other than the manufacture of clutch plates. In all cases, the method enables relatively speedy and accurate assembly of parts.

Various alterations, modifications and/or additions may be introduced into the constructions and arrangements of parts previously described without departing from the spirit or ambit of the invention as defined by the appended claims.

Having now described my invention, what I claim as new and desire to secure by Letters Patent is:

1. A method of forming a hollow fastener from metal sheet including the steps of: placing the metal sheet between two dies, one of which has a cavity therein and the other has a plunger connected thereto, said plunger being axially movable relative to the respective said die and being receivable in said cavity with clearance such that an annular space is defined between said plunger and said cavity; causing said plunger to engage a portion of said sheet which overlies said cavity and which is to form an end of said fastener; subjecting said plunger to a bias force so as to urge it towards said cavity and thereby apply pressure against said sheet portion, said pressure being sufficient to apply plastic and elastic stresses to cause said sheet portion to distort and protrude into said cavity but being insufficient to cause said plunger to break through said metal sheet, and to thereby introduce predominant tensile forces into said sheet portion and the immediately surrounding portion of said sheet; closing said dies while maintaining said pressure on the distorted sheet portion and thereby compressing an annular portion of said sheet which surrounds said cavity so as to cause metal to be displaced from that annular portion; and maintaining said bias force on the plunger during said compression so that the pressure thereby applied to said distorted portion causes said displaced metal to be directed to flow and be drawn into the mouth of said cavity and be formed around said plunger under the influence of said predominant tensile forces, and to cause the plunger to move into said cavity while continuing to engage and press against said fastener end, whereby the metal which is displaced flows and is drawn into said cavity through said space to form a constant thickness cylindrical tubular portion between said annular portion and said fastener end and tension is maintained in said tubular portion as it is being formed.

2. A method according to claim 1, wherein a nose portion of the plunger engages said metal sheet portion and said bias force is such as to cause said nose portion to produce an indentation in said sheet portion prior to commencement of said compression.

3. A method according to claim 2, wherein said nose portion is substantially fully contained in said indentation at the completion of the indentation forming step.

4. A method according to claim 1 wherein said nose portion is of rounded form.

5. A method according to claim 1, wherein said tubular portion is cold formed from said metal sheet.

6. A method according to claim 1, wherein said bias force is imposed by at least one spring acting on said plunger.

7. A method according to claim 1, wherein said one die includes a plurality of said cavities and said other die includes an equal number of said plungers, and each said plunger is associated with a respective said cavity.

8. A method of securing two sheets in face to face relationship, at least one of which is metal sheet, including the steps of forming at least one hollow fastener on said metal sheet in accordance with the method of claim 1, forming a hole in the other said sheet to receive said fastener, placing said sheets in face to face engagement with said fastener projecting through said hole, and mechanically deforming the terminal end of said fastener so as to secure said sheets together.

9. A method according to claim 8, wherein at least one said sheet includes a layer of friction material and a metal backing secured to that layer.

10. A method according to claim 9, wherein said fastener is formed on said metal backing.

11. A method according to claim 9, wherein said metal backing and said friction layer form a friction component of a clutch plate assembly and the other said sheet in a cushion segment of such an assembly.

12. A method according to claim 9, wherein said sheet having the fastener thereon is the main plate of a clutch plate assembly and the other said sheet is a cushion segment of such an assembly.

13. A method according to claim 1, wherein said compression produces an annular recess in the side of said sheet opposite said cavity.

14. A method according to claim 1, wherein said compression produces an annular recess in both sides of said sheet.

15. A method according to claim 1, wherein at least part of a terminal end wall of said fastener is removed to provide an open ended passage through said fastener.

* * * * *